US012769866B2

(12) United States Patent
Lee et al.

(10) Patent No.: US 12,769,866 B2
(45) Date of Patent: Oct. 20, 2026

(54) METHOD FOR PROCESSING UNAUTHORIZED CONTENT AND APPARATUS THEREOF

(71) Applicant: SAMSUNG SDS CO., LTD., Seoul (KR)

(72) Inventors: Haneol Lee, Seoul (KR); Yongkook Park, Seoul (KR); Jeongyeol Kim, Seoul (KR); Myoungkyhun Choi, Seoul (KR); Minah Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 32 days.

(21) Appl. No.: 19/073,734

(22) Filed: Mar. 7, 2025

(65) Prior Publication Data

US 2025/0284834 A1 Sep. 11, 2025

(30) Foreign Application Priority Data

Mar. 7, 2024 (KR) ........................ 10-2024-0032491
May 23, 2024 (KR) ........................ 10-2024-0067387

(51) Int. Cl.
*G06F 21/00* (2013.01)
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

| | | | | |
|---|---|---|---|---|
| 7,522,932 | B2 * | 4/2009 | Park | H04L 65/4038 455/518 |
| 10,951,703 | B1 * | 3/2021 | Ghosh | H04L 51/224 |
| 11,050,829 | B2 * | 6/2021 | Park | G06F 11/30 |
| 2003/0016632 | A1 * | 1/2003 | Refai | H04M 3/56 455/445 |
| 2014/0026028 | A1 * | 1/2014 | Hepper | G06F 16/958 715/234 |
| 2023/0244802 | A1 * | 8/2023 | Paul | G06F 16/176 707/608 |

* cited by examiner

*Primary Examiner* — Maung T Lwin
(74) *Attorney, Agent, or Firm* — NSIP Law

(57) ABSTRACT

A processing method including detecting an authorized client to determine whether to approve a deletion request of content, obtained from a first message from a request client, transmitting a second message requesting approval for the deletion request of the content to the detected authorized client, and determining whether to delete the content, based on a third message received from the authorized client.

17 Claims, 5 Drawing Sheets

METHOD FOR PROCESSING UNAUTHORIZED CONTENT AND APPARATUS THEREOF

CROSS-REFERENCE TO RELATED APPLICATION(S)

This application claims the benefit under 35 USC § 119(a) of Korean Patent Application No. 10-2024-0032491 filed on Mar. 7, 2024 and Korean Patent Application No. 10-2024-0067387 filed on May 23, 2024, in the Korean Intellectual Property Office, the entire disclosures of which are incorporated herein by reference for all purposes.

BACKGROUND OF THE INVENTION

1. Field of the Invention

The disclosure relates to a method and device for deleting content in a messenger and, more specifically, to a method and device for deleting a chat room or chat message created by another person.

2. Description of the Prior Art

Various types of messengers provide functions of deleting content such as chat rooms or chat messages. However, in existing messengers, if a chat room or chat message created by another person is deleted without the approval of the corresponding person, it may cause confusion to the participants in the chat room. In order to prevent such confusion, information about the person who deleted the chat room must be provided to the participants in the chat room, but there is a problem in which the channel for delivering the information is lost because the chat room has already been deleted.

In addition, redundant approval requests may occur for the same content because the person authorized for deletion is able to be specified but the person requesting deletion may be unspecified people according to the characteristics of messengers. In this case, the person with the deletion authority must repeatedly perform the approval or rejection procedure. Therefore, a method is required to effectively delete content created by others in a messenger.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including detecting an authorized client to determine whether to approve a deletion request of content, obtained from a first message from a request client, transmitting a second message requesting approval for the deletion request of the content to the detected authorized client, and determining whether to delete the content, based on a third message received from the authorized client.

The content may include one or more of a chat room, a chat message, additional information for each message, a registration file, and a notice on a messenger.

The authorized client may be a participant client that created the content on a messenger.

The first message may include one or more of content identification information of the content and request client identification information of the request client.

The method may include determining whether a duplicate deletion request for the content is present, based on the content identification information.

The method may include generating deletion request event identification information for identifying a deletion request event for the content responsive to determining no presence of the duplicate deletion request for the content, mapping the generated deletion request event identification information with the request client identification information, and storing the mapped generated deletion request event identification information in a storage.

The method may include searching for deletion request event identification information indicating a deletion request event for the content responsive to determining a presence of the duplicate deletion request for the content, mapping the searched deletion request event identification information with the request client identification information, and storing the mapped searched deletion request event identification information in a storage.

The second message may include one or more of identification information of the content, identification information of the request client, and deletion request event identification information for identifying a deletion request event for the content.

The third message may include deletion information indicating that the deletion request for the content has been approved or rejected.

The method may include deleting the content using authorized client identification information of the authorized client response to the third message including deletion information indicating that the deletion request for the content has been approved.

The method may include transmitting a deletion message indicating that the content has been deleted by the authorized client to all participant clients in a chat room responsive to the deletion request being related to the chat room.

The method may include transmitting a rejection message indicating that the deletion request for the content has been rejected to the request client responsive to the third message including deletion information indicating that the deletion request of the content has been rejected.

In general aspect, here is provided a device including one or more processors configured to execute instructions and a memory storing the instructions, and an execution of the instructions configures the one or more processors to detect an authorized client to determine whether to approve a deletion request of content, obtained from a first message from a request client, transmit a second message requesting approval for the deletion request of the content to the detected authorized client, and determine whether to delete the content, based on a third message received from the authorized client.

The content may include one or more of a chat room, a chat message, additional information for each message, a registration file, and a notice on a messenger.

The authorized client may be a participant client that created the content on a messenger.

The first message may include one or more of identification information of the content and identification information of the request client.

The second message may include one or more of identification information of the content, identification information of the request client, and deletion request event identification information for identifying a deletion request event for the content.

The third message may include deletion information indicating that the deletion request for the content has been approved or rejected.

The one or more processors may be further configured to delete the content using identification information of the authorized client responsive to the third message including deletion information indicating that the deletion request for the content has been approved.

In a general aspect, here is provide a computer-readable storage medium storing one or more programs for execution by one or more processors of a computing device, the one or more programs including instructions for detecting an authorized client to determine whether to approve a deletion request for content, the deletion request being received within a first message from a request client, transmitting a second message requesting approval for the deletion request of the content to the detected authorized client, and determining whether to delete the content, based on a third message received from the authorized client.

Figure 1:
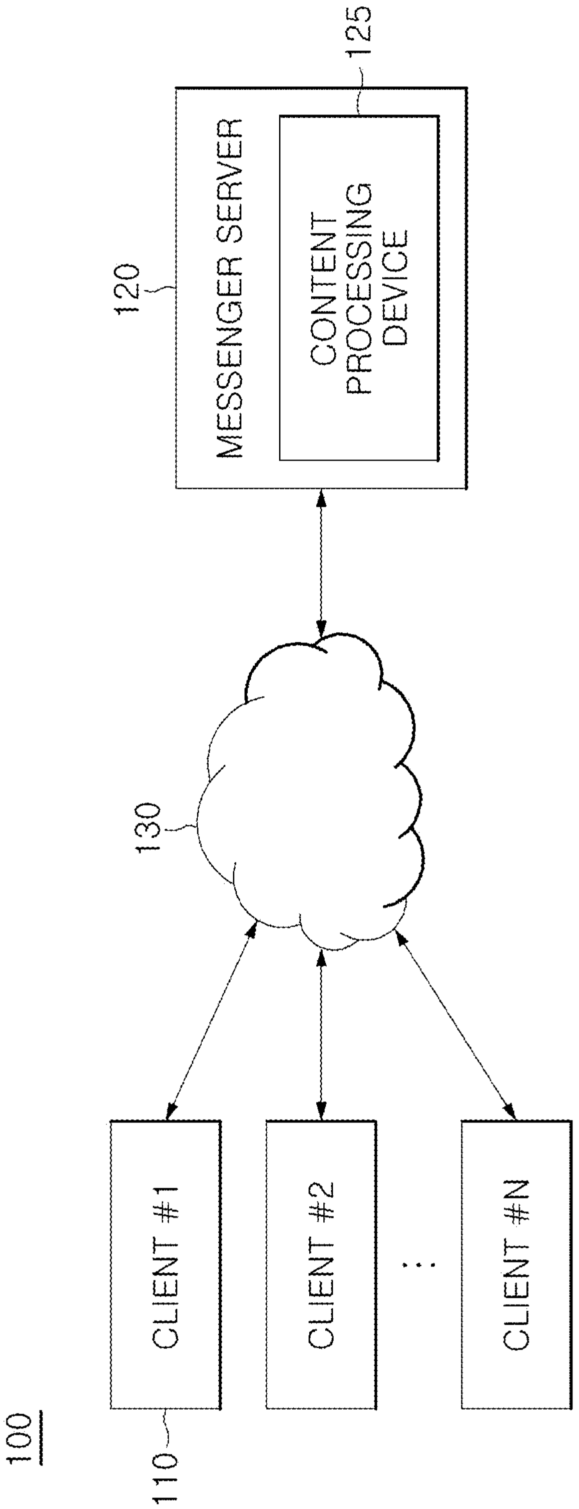
FIG. 1 is a diagram illustrating the configuration of a messenger service providing system according to an embodiment of the disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used in connection with various example embodiments of the disclosure, any use of the terms "module" or "unit" means hardware and/or processing hardware configured to implement software processor or computer executable instructions (e.g., as code segment(s), program(s), and/or firmware) to configure such processing hardware to perform corresponding operations, and may interchangeably be used with other terms, for example, "logic," "logic block," "part," or "circuitry". As one non-limiting example, an application-predetermined integrated circuit (ASIC) may be referred to as an application-predetermined integrated module. As another non-limiting example, a field-programmable gate array (FPGA) or an application-specific integrated circuit (ASIC) may be respectively referred to as a field-programmable gate unit or an application-specific integrated unit. In a non-limiting example, such software executable instructions may include components such as software program components, object-oriented software code or program components, class components, and may include processor task components, processes, functions, attributes, procedures, subroutines, segments of the software code or program. Software Executable instructions may further include programs code, drivers, firmware, microcode, circuits, data, database, data structures, tables, arrays, and variables. In another non-limiting example, such software executable instructions may be executed by one or more central processing units (CPUs) of an electronic device or secure multimedia card.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The disclosure proposes a method and device for deleting content created by others with the approval of others in a messenger. In addition, the disclosure proposes a method and device for processing duplicate deletion requests for the same content at once in a messenger.

Hereinafter, various embodiments of the disclosure will be described in detail with reference to the drawings.

FIG. 1 is a block diagram illustrating the configuration of a messenger service providing system according to an embodiment of the disclosure.

Referring to FIG. 1, a messenger service providing system 100 according to an embodiment of the disclosure may include a plurality of clients 110, a messenger server 120, and a communication network 130.

The plurality of clients 110 and the messenger server 120 may be connected to each other through a communication network 130. The communication network 130 may include a wired network and a wireless network, and specifically, may include various networks such as a local area network (LAN), a metropolitan area network (MAN), and a wide area network (WAN). In addition, the communication network 130 may include the World Wide Web (WWW) well known. However, the communication network 130 according to the disclosure is not limited to the networks described above, and may include at least one of the wireless data network, the telephone network, and the wired/wireless television network well known.

The plurality of clients 110 may provide a messenger service by interworking with the messenger server 120.

For example, the plurality of clients 110 may download and install an application (hereinafter referred to as a "messenger application") for providing a messenger service from the App Store or Play Store. In addition, the plurality of clients 110 may download and install a program (hereinafter referred to as a "messenger program") for providing a messenger service from a website or the like.

The plurality of clients 110 may execute a pre-installed messenger application or messenger program to provide a messenger service to a user. At this time, the plurality of clients 110 may obtain and provide data (e.g., service UI information, chat rooms, chat messages, etc.) related to the messenger service from the messenger server 120.

The plurality of clients 110 may perform a function of creating content on the messenger according to user commands or the like. Here, the content may include at least one of chat rooms, chat messages, additional information for each message (e.g., read information, personal storage record, etc.), registration files, or notices.

The plurality of clients 110 may perform a function of deleting created content from the messenger by interworking with the messenger server 120. At this time, the plurality of clients 110 may include a client (hereinafter referred to as a "request client") of a requester who requests deletion of content and a client (hereinafter referred to as an "authorized client") of an authorized person who determines whether to approve the deletion request of the content. Here, the request client indicates the client of at least one participant who requests the deletion of content, and the authorized client indicates the client of a participant who created the content subject to the deletion request.

The plurality of clients 110 may include all types of electronic devices capable of connecting to the Internet. For example, the plurality of clients 110 may include mobile phones, smartphones, laptop computers, desktop computers, digital broadcasting terminals, PDAs (personal digital assistants), PMPs (portable multimedia players), navigation devices, slate PCs, tablet PCS, ultrabooks, wearable devices, and the like, but are not limited thereto.

The messenger server 120 may provide a messenger service to the plurality of clients 110. At this time, the messenger server 120 may provide data related to the messenger service to the plurality of clients 110.

For example, the messenger server 120 may forward a chat message received from a first client to one or more other clients. In addition, the messenger server 120 may forward chat messages received from one or more other clients to the first client.

The messenger server 120 may manage information about clients who opened a chat room, information about all clients who participated in the chat room, information about chat messages obtained from the plurality of clients, and the like.

The messenger server 120 may perform a function of deleting content created from the messenger by interworking with the plurality of clients 110. In addition, the messenger server 120 may perform a function of processing duplicate deletion requests for the same content at once in the messenger. In order to perform this function, the messenger server 120 may include a content processing device 125. The content processing device 125 will be described in more detail later.

Figure 2A:
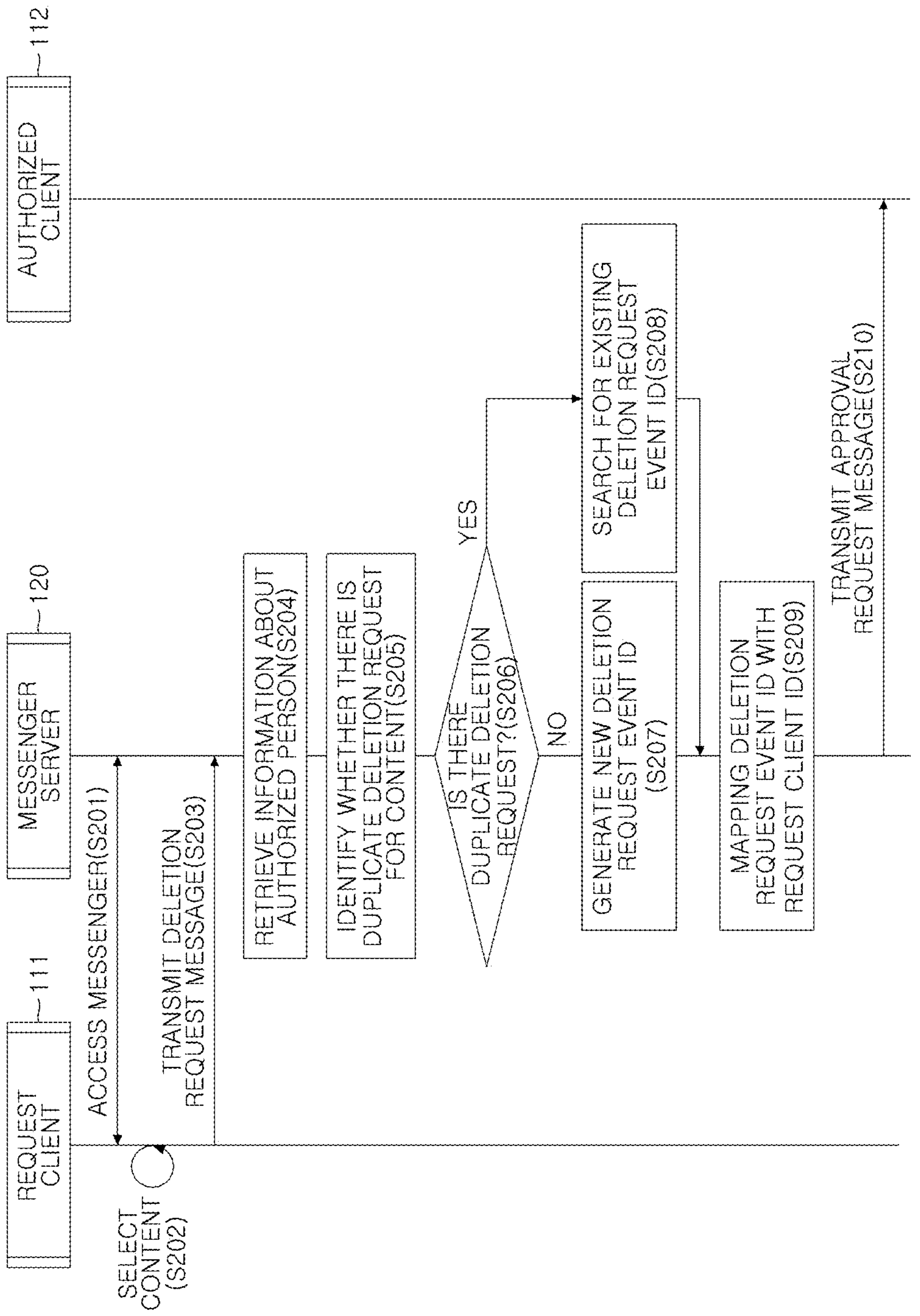
FIGS. 2A and 2B are flowcharts illustrating a content processing method according to an embodiment of the disclosure.
Figure 2B:
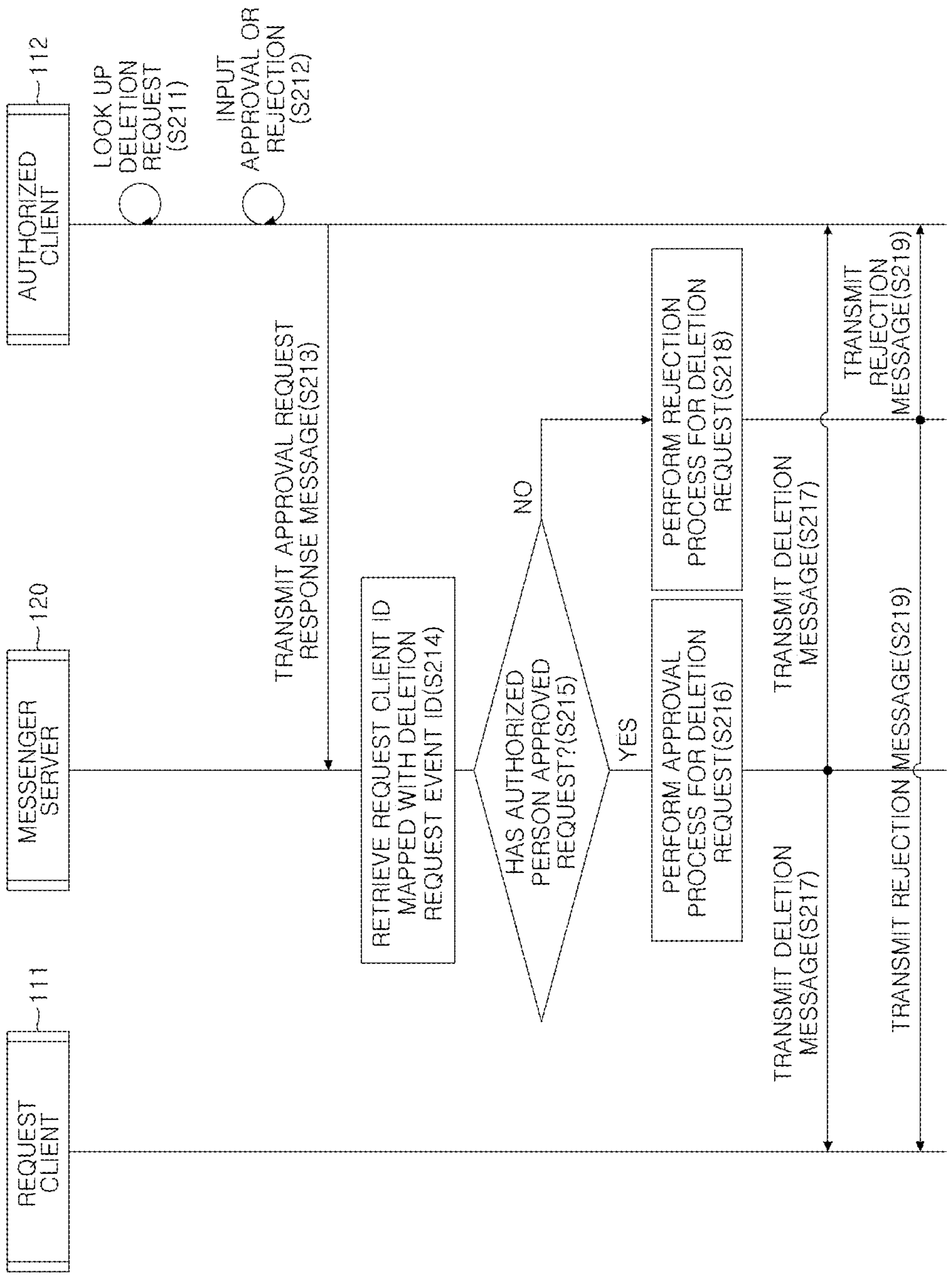

FIGS. 2A and 2B are flowcharts illustrating a content processing method according to an embodiment of the disclosure. The content processing method may be performed by the messenger service providing system 100. Although the content processing method is illustrated as multiple steps in the flowcharts, at least some of the steps may be performed in a different order, performed together with other steps while being combined therewith, omitted, or divided into sub-steps to be performed, or one or more other steps not illustrated may be added thereto and performed.

Referring to FIGS. 2A and 2B, the request client 111 may connect to the messenger server 120 and provide a messenger service to a requester (S201). The requester may request deletion of content (e.g., a chat room, a chat message, a registered file, a notice, etc.) through the messenger service.

An authorized client 112 may connect to the messenger server 120 and provide a messenger service to an authorized person. The authorized person may approve or reject a deletion request for content through the messenger service.

If content to be deleted is selected by the requester (S202), the request client 111 may transmit a message requesting deletion of the selected content (hereinafter referred to as a "deletion request message") to the messenger server 120 (S203). At this time, the deletion request message may include identification information about the content (hereinafter referred to as "content identification information") and/or identification information about the request client (hereinafter referred to as "request client identification information"). The content identification information or the request client identification information may include a unique ID or a unique key, but is not necessarily limited thereto.

Upon receiving the deletion request message, the messenger server 120 may detect content identification information from the message and retrieve, from the storage, information about an authorized person who determines whether or not to approve the deletion request for the content, based on the detected content identification information (S204). Here, if the content is a chat room, the authorized person is a participant who opened the chat room, and if the content is a chat message, the authorized person is a participant who sent the chat message. The information about the authorized person may include authorized client identification information. Similarly, the authorized client identification information may include a unique ID or a unique key, but is not necessarily limited thereto.

The messenger server 120 may identify whether or not there is a duplicate deletion request for the corresponding content, based on the content identification information included in the received deletion request message (S205). At this time, the messenger server 120 may access the storage to identify whether or not there is a duplicate deletion request for the content.

If there is no duplicate deletion request for the content as a result of the identification in step 205 (S206), the messenger server 120 may generate new deletion request event identification information to identify a deletion request event for the corresponding content (S207).

The messenger server 120 may map the newly generated deletion request event identification information (e.g., a deletion request event ID) with the request client identification information (e.g., a request client ID) and store the same in the storage (S209). Meanwhile, as another embodiment, the messenger server 120 may map a newly generated deletion request event ID with a request client ID and an authorized client ID, and store them in the storage.

On the other hand, if there is a duplicate deletion request for the content as a result of the identification in step 205 (S206), the messenger server 120 may access the storage and search for an existing deletion request event ID indicating the deletion request event for the corresponding content (S208).

The messenger server 120 may map the existing deletion request event ID with the request client ID and store them in the storage (S209). Meanwhile, as another embodiment, the messenger server 120 may map the existing deletion request event ID with the request client ID and the authorized client ID, and store them in the storage.

The messenger server 120 may transmit a message requesting approval for the deletion request of content (hereinafter referred to as an "approval request message") to the authorized client 112 (S210). At this time, the approval request message may include at least one piece of content identification information, request client identification information, and deletion request event identification information.

For example, if a socket is connected between the messenger server 120 and the authorized client 112, the messenger server 120 may immediately transmit the approval request message. On the other hand, if no socket is connected between the messenger server 120 and the authorized client 112, the messenger server 120 may temporarily store the approval request message in the storage and transmit it when the socket is connected.

Meanwhile, although not shown in the drawing, the messenger server 120 may transmit the approval request message to the request client 111. This is intended to synchronize a plurality of terminals when the requester has the plurality of terminals.

The authorized client 112 may output the approval request message received from the messenger server 120.

When a deletion request enquiry command is input from the authorized person, the authorized client 112 may access the messenger server 120 and look up the deletion request event ID for the content (S211). At this time, the authorized client 112 may look up the deletion request event ID, based on the identification information about the content.

The authorized client 112 may look up a request client ID mapped with the deletion request event ID according to the enquiry command from the authorized person.

The authorized client 112 may provide the obtained deletion request event ID and/or request client ID to the authorized person. If an approval or rejection command for the deletion request event ID is input from the authorized person (S212), the authorized client 112 may transmit an approval request response message to the messenger server 120 (S213). At this time, the approval request response message may include the deletion request event ID and approval or rejection information for the deletion request corresponding to the deletion request event ID. The approval request response message may be referred to as an approval message or a rejection message depending on the approval or rejection by the authorized person.

The authorized person may perform approval or rejection on a deletion request event basis rather than a request client basis, thereby processing duplicate deletion requests for the same content at once.

Upon receiving the approval request response message, the messenger server 120 may retrieve, from the storage, the request client ID mapped with the deletion request event ID included in the message (S214).

The messenger server 120 may identify whether the authorized person has approved the deletion request corresponding to the deletion request event ID, based on the approval or rejection information included in the received approval request response message (S215).

If the authorized person has approved the deletion request corresponding to the deletion request event ID as a result of the identification in step 215, the messenger server 120 may perform approval process for the deletion request of the corresponding content (S216).

For example, the messenger server 120 may map a status value (e.g., "1") corresponding to approval with the deletion request event ID and request client ID, and store the same in the storage. In addition, the messenger server 120 may delete the content with the authorized client ID. Accordingly, all participants in the chat room are provided with a display indicating that the content was deleted by the authorized person in the same manner as the existing deletion process.

The messenger server 120 may transmit a deletion message indicating that the content has been deleted by the authorized person to all participant clients in the chat room (S217). At this time, the messenger server 120 may transmit the deletion message to all participant clients through a socket.

All participant clients may display the deletion message received from the messenger server 120. All participants may identify that the content has been deleted by the authorized person through this deletion message.

On the other hand, if the authorized person has rejected the deletion request corresponding to the deletion request event ID as a result of the verification in step 215 above, the messenger server 120 may perform rejection process for the deletion request of the corresponding content (S218).

For example, the messenger server 120 may map a status value (e.g., "0") corresponding to rejection with the deletion request event ID and request client ID, and store the same in the storage.

The messenger server 120 may transmit a rejection message indicating that the deletion request for the content has been rejected to the request client 111 (S219). At this time, messenger server 120 may transmit the rejection message to the request client 111 through a socket.

The request client 111 may display the rejection message received from the messenger server 120. The requester may identify that the deletion request for the content has been rejected through this rejection message.

Meanwhile, according to the embodiment of the disclosure, the messenger server 120 may transmit the rejection message to the authorized client 112. This is intended to synchronize a plurality of terminals when the authorized person has the plurality of terminals.

As described above, the content deletion method according to an embodiment of the disclosure may delete the content created by others with the approval of others to perform the deletion process used in the existing messenger in the same manner, thereby maintaining user friendliness and consistency of the authorization system. In addition, the content deletion method may process duplicate deletion requests for the same content at once, based on the deletion request event ID mapped with one or more request client IDs, thereby minimizing inconvenience of the authorized person who has to repeat the same approval or rejection procedure due to the duplicate deletion requests.

Figure 3:
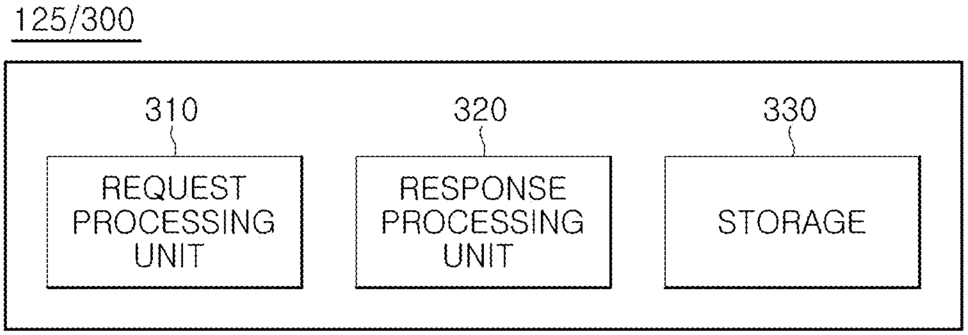
FIG. 3 is a block diagram of a content processing device according to an embodiment of the disclosure.

FIG. 3 is a block diagram of a content processing device according to an embodiment of the disclosure.

Referring to FIG. 3, a content processing device 125 or 300 according to an embodiment of the disclosure may include a request processing unit 310, a response processing unit 320, and a storage 330. The elements illustrated in FIG. 3 are not essential for implementing the content processing device, and the content processing device described in this specification may have more or fewer elements than the elements described above.

The request processing unit 310 may receive a message requesting deletion of specific content (hereinafter referred to as a "deletion request message") from the request client 111. In this case, the deletion request message may include content identification information and/or request client identification information.

The request processing unit 310 may retrieve, from the storage 330, information about an authorized person who determines whether or not to approve the deletion request for the content, based on the content identification information included in the received deletion request message. The information about the authorized person may include authorized client identification information.

The request processing unit 310 may identify whether or not there is a duplicate deletion request for the corresponding content, based on the content identification information included in the received deletion request message. At this time, the request processing unit 310 may access the storage 330 to identify whether or not there is a duplicate deletion request for the content.

If there is no duplicate deletion request for the content, the request processing unit 310 may generate a new deletion request event ID to identify a deletion request event for the corresponding content. The request processing unit 310 may map the newly generated deletion request event ID with a request client ID and/or authorized client ID, and store the same in the storage 330.

If there is a duplicate deletion request for the content, the request processing unit 310 may access the storage 330 to search for an existing deletion request event ID indicating a deletion request event for the corresponding content. The request processing unit 310 may map the existing deletion request event ID with the request client ID and/or authorized client ID, and store the same in the storage 330.

The request processing unit 310 may transmit a message requesting approval for the deletion request of the content (i.e., an approval request message) to the authorized client 112. At this time, the approval request message may include at least one piece of content identification information, request client identification information, and deletion request event identification information.

The response processing unit 320 may receive an approval request response message to the approval request message from the authorized client 112. At this time, the approval request response message may include the deletion request event ID and approval or rejection information for the deletion request corresponding to the deletion request event ID. The approval request response message may be referred to as an approval message or a rejection message depending on the approval or rejection by the authorized person.

The response processing unit 320 may access the storage 330 and retrieve the request client ID mapped with the deletion request event ID included in the received approval request response message.

The response processing unit 320 may identify whether or not the authorized person has approved the deletion request corresponding to the deletion request event ID, based on approval or rejection information included in the received approval request response message.

If the authorized person has approved the deletion request corresponding to the deletion request event ID, the response processing unit 320 may perform approval processing for the deletion request of the corresponding content. At this time, the response processing unit 320 may map a status value (e.g., "1") corresponding to approval with the deletion request event ID and request client ID, and store the same in the storage 330. Then, the response processing unit 320 may delete the content with the authorized client ID.

The response processing unit 320 may send a deletion message indicating that the content has been deleted by the authorized person to all participant clients in the chat room.

On the other hand, if the authorized person has rejected the deletion request corresponding to the deletion request event ID, the response processing unit 320 may perform rejection processing for the deletion request of the corresponding content. At this time, the response processing unit 320 may map a status value (e.g., "0") corresponding to rejection with the deletion request event ID and request client ID, and store the same in the storage 330.

The response processing unit 320 may transmit a rejection message indicating that the deletion request for the content has been rejected to the request client 111.

The storage 330 may store data necessary for performing a content deletion function. For example, the storage 330 may include content identification information, deletion request event identification information, request client identification information, authorized client identification information, and status value information indicating approval or rejection by the authorized person.

As described above, the content deletion device according to an embodiment of the disclosure may delete the content created by others with the approval of others to perform the deletion process used in the existing messenger in the same manner, thereby maintaining user friendliness and consistency of the authorization system. In addition, the content deletion device may process duplicate deletion requests for the same content at once, based on the deletion request event ID mapped with one or more request client IDs, thereby minimizing inconvenience of the authorized person who has to repeat the same approval or rejection procedure due to the duplicate deletion requests.

Figure 4:
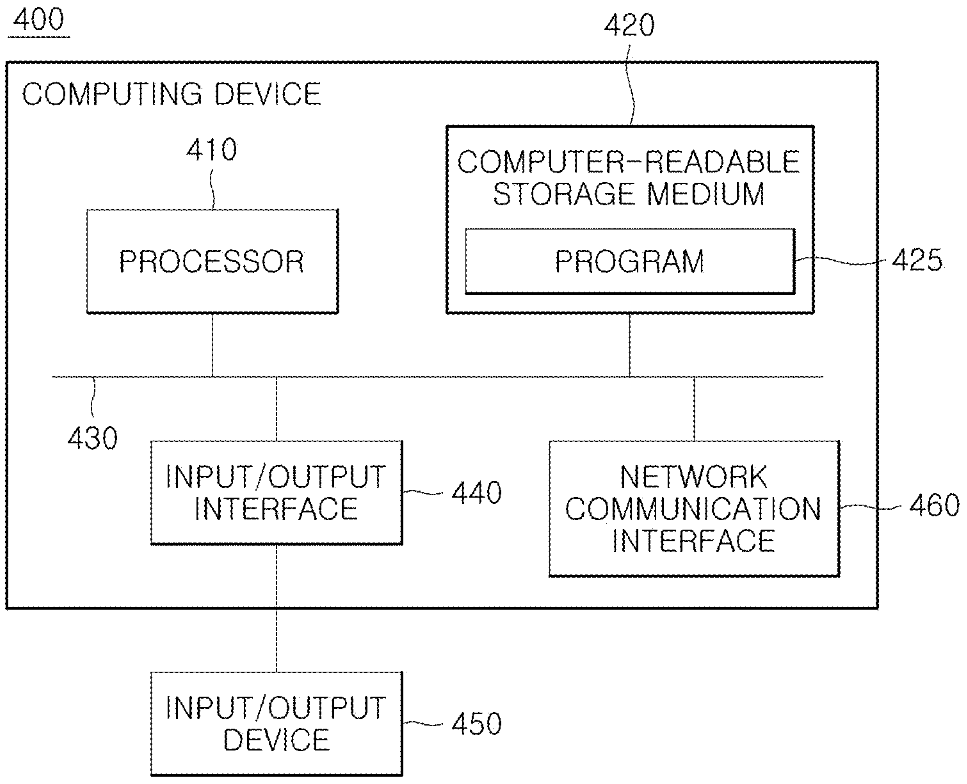
FIG. 4 is a block diagram of a computing device according to an embodiment of the disclosure.

FIG. 4 is a block diagram of a computing device according to an embodiment of the disclosure.

Referring to FIG. 4, a computing device 400 according to an embodiment of the disclosure includes at least one processor 410, a computer-readable storage medium 420, and a communication bus 430. The computing device 400 may implement the content processing device 300 described above or the elements 310 to 330 that constitute the content processing device 300.

The processor 410 may cause the computing device 400 to operate according to the embodiments described above. For example, the processor 410 may execute one or more programs 425 stored on a computer-readable storage medium 420. The one or more programs may include one or more computer-executable instructions, which may be configured to cause, when executed by the processor 410, the computing device 400 to perform operations according to the embodiments.

The computer-readable storage medium 420 is configured to store computer-executable instructions, program code, program data, and/or other suitable forms of information. The program 425 stored on the computer-readable storage medium 420 includes a set of instructions executable by the processor 410. In an embodiment, the computer-readable storage medium 420 may be memory (volatile memory, such as random access memory, nonvolatile memory, or a suitable combination thereof), one or more magnetic disk storage devices, optical disk storage devices, flash memory devices, another type of storage medium capable of being accessed by the computing device 400 and storing desired information, or a suitable combination thereof.

The communication bus 430 interconnects various elements of the computing device 400, including the processor 410 and the computer-readable storage medium 420.

The computing device 400 may also include one or more input/output interfaces 440 that provide interfaces for one or more input/output devices 450, and one or more network communication interfaces 460. The input/output interfaces 440 and the network communication interfaces 460 are connected to the communication bus 430.

The input/output device 450 may be connected to other components of the computing device 400 via the input/output interface 440. For example, the input/output devices 450 may include input devices such as a pointing device (mouse, trackpad, etc.), a keyboard, a touch input device (touchpad, touchscreen, etc.), a voice or sound input device, various types of sensor devices and/or photographing devices, and/or output devices such as a display device, a printer, a speaker, and/or a network card. The exemplary input/output device 450 may be included inside the computing device 400 as a component that constitutes the computing device 400, or may be configured as a separate device distinct from the computing device 400 and then connected to the computing device 400.

The effects of the content processing method and device according to the embodiments of the disclosure will be described below.

According to at least one of the embodiments of the disclosure, the content created by others may be deleted with the approval of others to perform the deletion process used in the existing messenger in the same manner, so it is possible to maintain user friendliness and consistency of the authorization system.

In addition, according to at least one of the embodiments of the disclosure, duplicate deletion requests for the same content may be processed at once using deletion request event identification information, so it is possible to minimize inconvenience of the authorized person who has to repeat the same approval or rejection procedure due to the duplicate deletion requests.

However, the effects obtainable from the content processing method and device according to the embodiments of the disclosure are not limited to those mentioned above, and other effects that are not mentioned may be clearly understood by those skilled in the art to which the disclosure pertains from the description below.

The computing devices, processors, memories, modules, units, systems, apparatuses, system 100, plurality of clients 110, messenger server 120, communication network 130, content processing device 125, content processing device 300, request processing unit 310, response processing unit 320, storage 330, computing device 400, at least one processor 410, computer-readable storage medium 420, communication bus 430, one or more input/output devices 450, and one or more network communication interfaces 460 described herein and disclosed herein described with respect to FIGS. 1-4 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMS, CD-Rs, CD+Rs, CD-RWs, CD+RW, DVD-ROM, DVD-Rs, DVD+Rs, DVD-RWs, DVD+RWs, DVD-RAMS, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

detecting an authorized client to determine whether to approve a deletion request of content, obtained from a first message from a request client, wherein the authorized client is a participant client that created the content on a messenger;

determining whether a duplicate deletion request for the content is present, based on one or more of content identification information of the content included in the first message;

transmitting a second message requesting approval for the deletion request of the content to the detected authorized client; and determining whether to delete the content, based on a third message received from the authorized client.

2. The method according to claim 1, wherein the content comprises one or more of a chat room, a chat message, additional information for each message, a registration file, and a notice on a messenger.

3. The method according to claim 1, wherein the first message comprises the one or more of content identification information of the content and request client identification information of the request client.

4. The method according to claim 1, further comprising:

generating deletion request event identification information for identifying a deletion request event for the content responsive to determining no presence of the duplicate deletion request for the content;

mapping the generated deletion request event identification information with the request client identification information; and storing the mapped generated deletion request event identification information in a storage.

5. The method according to claim 1, further comprising:

searching for deletion request event identification information indicating a deletion request event for the content responsive to determining a presence of the duplicate deletion request for the content;

mapping the searched deletion request event identification information with the request client identification information; and storing the mapped searched deletion request event identification information in a storage.

6. The method according to claim 1, wherein the second message comprises the one or more of content identification information, identification information of the request client, and deletion request event identification information for identifying a deletion request event for the content.

7. The method according to claim 1, wherein the third message comprises deletion information indicating that the deletion request for the content has been approved or rejected.

8. The method according to claim 7, further comprising deleting the content using authorized client identification information of the authorized client response to the third message comprising deletion information indicating that the deletion request for the content has been approved.

9. The method according to claim 8, further comprising:

transmitting a deletion message indicating that the content has been deleted by the authorized client to all participant clients in a chat room responsive to the deletion request being related to the chat room.

10. The method according to claim 7, further comprising transmitting a rejection message indicating that the deletion request for the content has been rejected to the request client responsive to the third message comprising deletion information indicating that the deletion request of the content has been rejected.

11. A device, comprising:

one or more processors configured to execute instructions; and a memory storing the instructions, wherein execution of the instructions configures the one or more processors to:

detect an authorized client to determine whether to approve a deletion request of content, obtained from a first message from a request client, wherein the authorized client is a participant client that created the content on a messenger;

determine whether a duplicate deletion request for the content is present, based on one or more of identification information of the content included in the first message;

transmit a second message requesting approval for the deletion request of the content to the detected authorized client; and determine whether to delete the content, based on a third message received from the authorized client.

12. The device according to claim 11, wherein the content comprises one or more of a chat room, a chat message, additional information for each message, a registration file, and a notice on a messenger.

13. The device according to claim 11, wherein the first message comprises the one or more of identification information of the content and identification information of the request client.

14. The device according to claim 11, wherein the second message comprises the one or more of identification information of the content, identification information of the request client, and deletion request event identification information for identifying a deletion request event for the content.

15. The device according to claim 11, wherein the third message comprises deletion information indicating that the deletion request for the content has been approved or rejected.

16. The device according to claim 15, wherein the one or more processors are further configured to:

delete the content using identification information of the authorized client responsive to the third message comprising deletion information indicating that the deletion request for the content has been approved.

17. A computer-readable storage medium storing one or more programs for execution by one or more processors of a computing device, the one or more programs including instructions for:

detecting an authorized client to determine whether to approve a deletion request for content, the deletion request being received within a first message from a request client, wherein the authorized client is a participant client that created the content on a messenger;

determining whether a duplicate deletion request for the content is present, based on one or more of content identification information of the content included in the first message;

transmitting a second message requesting approval for the deletion request of the content to the detected authorized client; and determining whether to delete the content, based on a third message received from the authorized client.

* * * * *